United States Patent
Komori (10) Patent No.: US 10,859,539 B2
(45) Date of Patent: Dec. 8, 2020

(54) SAMPLE VAPORIZATION UNIT

(71) Applicant: SHIMADZU CORPORATION, Kyoto (JP)

(72) Inventor: Yuki Komori, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 139 days.

(21) Appl. No.: 16/312,037

(22) PCT Filed: Sep. 12, 2016

(86) PCT No.: PCT/JP2016/076851
§ 371 (c)(1),
(2) Date: Dec. 20, 2018

(87) PCT Pub. No.: WO2018/047348
PCT Pub. Date: Mar. 15, 2018

(65) Prior Publication Data
US 2019/0376935 A1    Dec. 12, 2019

(51) Int. Cl.
*G01N 30/12* (2006.01)
*G01N 30/02* (2006.01)
*G01N 30/18* (2006.01)

(52) U.S. Cl.
CPC .............. *G01N 30/12* (2013.01); *G01N 30/18* (2013.01); *G01N 2030/025* (2013.01); *G01N 2030/126* (2013.01); *G01N 2030/127* (2013.01)

(58) Field of Classification Search
CPC ............. G01N 30/12; G01N 2030/126; G01N 2030/127; G01N 30/18
See application file for complete search history.

(56) References Cited

U.S. PATENT DOCUMENTS 3,733,909 A  *  5/1973  Golovistikov ......... G01N 30/12
                                                     73/864.86
2013/0118484 A1*  5/2013  Ishikita ................ A61M 16/01
                                                     128/200.14

FOREIGN PATENT DOCUMENTS

| JP | 3206105 | 9/1916 |
| JP | 2009-92672 | 4/2009 |
| WO | WO 2016/132439 | 8/1916 |

OTHER PUBLICATIONS

PCT/JP2016/076851, International Search Report and Written Opinion dated Dec. 6, 2016, 2 pages—English, 5 pages—Japanese.

* cited by examiner

*Primary Examiner* — Paul M. West
(74) *Attorney, Agent, or Firm* — Andrew F. Young, Esq.; Nolte Lackenbach Siegel

(57) ABSTRACT

When mounting a second assembly 36 to a first assembly 35 that is fixed to a main body, the second assembly 36 engages a second connection element 54 of a non-rotation unit 361 of the second assembly 36 with a first connection element 354 of the first assembly 35. A rotating part 362 is mounted on the first assembly 35 when the rotation unit 362 is rotated. Therefore, an operator can carry out positioning for the second assembly 36 by connecting the second connection element 54 of the second assembly 36 with the first connection element 354 of the first assembly 35. The second assembly 36 can be smoothly mounted on the first assembly 35 that is fixed to the main body. The second connection element 54 of the non-rotation unit 361 connects with the first connection element 354 of the first assembly 35, so that the non-rotation unit 361 is prevented from rotating together with the rotation unit 362 during use and the assemblies that contact the non-rotation unit 361 are protected from damage.

4 Claims, 6 Drawing Sheets

SAMPLE VAPORIZATION UNIT

CROSS REFERENCE TO RELATED APPLICATIONS

This application relates to, and claims priority as a national-phase application from, PCT Ser. No.: PCT/JP2016/076851 filed Sep. 12, 2016, the entire contents of which are incorporated herein fully by reference.

FIGURE SELECTED FOR PUBLICATION

FIG. 3

BACKGROUND OF THE INVENTION

Field of the Invention

The present invention relates to a sample vaporization unit having an assembly to be mounted on the main body in which a sample vaporization chamber.

Description of the Related Art

A gas chromatograph comprises such as a sample injection unit, a column and a detector. With respect to the gas chromatograph, first, a carrier gas and a sample are supplied from the sample injection unit to the inside of the column, and each component of the sample is separated from one another while the carrier gas is passing (flowing) inside the column. Then, the detector detects the separated respective components.

The sample injection unit (sample vaporization unit) comprises the hollow main body having an opening at the upper end thereof and an assembly that is mountable (attachable) on the main body and removable (detachable) therefrom. The region of the sample injection unit inside the main body is formed as the sample vaporization chamber. An insert having a cylinder shape is inserted into the sample vaporization chamber of the sample injection unit. The insert contacts with the sample per se, so that the insert is arbitrarily changed (replaced) (e.g., referring to Patent Document 1).

When the insert is replaced, firstly, the assembly mounted on the main body is removed. And then, the insert is taken out from the main body through the opening. Then after, the new insert is inserted to the sample vaporization chamber of the main body through the opening. And the assembly is remounted on the main body so as to close the opening.

Therefore, the assembly must be mounted on the main body and removed therefrom when the insert is replaced.

RELATED PRIOR ART DOCUMENTS

Patent Document

Patent Document 1
JP 2009-92672 A1

ASPECTS AND SUMMARY OF THE INVENTION

Objects to be Solved

The conventional sample vaporization unit as set forth above, the assembly may not be smoothly mounted on the main body in case. Specifically, such an assembly is structurally larger than the mounting unit of the main body. Therefore, the mounting unit of the main body is hardly recognized by eyes when the assembly is mounted on the main body, so that the assembly may not be smoothly mounted.

In addition, generally, the assembly comprises a nut fastened to the main body and a pressing member. The operator mounts the assembly to main body as pressing the pressing member to the main body by fastening the nut. At that time, the pressing member may rotate together with the nut when fastening the nut. As a result, the contact part to the pressing member may be damaged.

Considering to the above incident, the purpose of the present invention is to provide a sample vaporization unit in which the assembly is smoothly and effortlessly mounted on the main body. In addition, another purposed of the present invention is to provide the sample vaporization unit in which the part contacting to the assembly is protected from a damage when the assembly is mounted on and removed from the main body.

Means for Solving the Problem (1) A sample vaporization unit, according to the aspect of the present invention, comprises an insert, a main body, a first assembly and a second assembly. The main body thereof further comprises a sample vaporization chamber inside thereof; The insert thereof is inserted into the sample vaporization chamber through an opening formed on the main body; The first assembly is fixed to the main body. The second assembly is mountable (attachable) to the first assembly and removable (detachable) therefrom and closes the opening while being mounted on the first assembly. The first assembly further comprises a first connection element. The second assembly further comprises a non-rotation unit and a rotation unit. The non-rotation unit comprises a second connection element positioned by connecting with the first connection element. The rotation unit is mounted on the first assembly by rotating relative to the non-rotation unit.

According to such an aspect, when mounting the second assembly on the first assembly that is fixed to the main body, the second assembly (non-rotation unit) is positioned by connecting the second connection element of the second assembly (non-rotation unit) on the first connection element of the first assembly. And when the rotation unit rotates from the state in which the non-rotation unit is being positioned, the rotation unit is mounted on the first assembly.

Therefore, when mounting the second assembly on the first assembly fixed to the main body, the positioning of the second assembly is carried out just by connecting the second connection element of the second assembly (non-rotation unit) to the first connection element of the first assembly.

As a result, the second assembly can be smoothly mounted on the first assembly that is fixed to the main body.

Further, when rotating the rotation unit, the second connection element of the non-rotation unit connects with the first connection element of the first assembly.

Therefore, it is prevented that the non-rotation unit rotates together with the rotation unit.

As a result, the assemblies that contact to the non-rotation unit can be protected from damaging.

(2) In addition, the non-rotation unit comprises optionally the first grip. The operator grips the first grip.

According to such an aspect, when mounting the second assembly to the first assembly that is fixed to the main body, the operator enables rotating the rotation unit while gripping the first grip of the non-rotation unit.

Therefore, the operator enables further smoothly mounting the second assembly relative to the first assembly.

(3) In addition, the-rotation unit comprises optionally the second grip. The operator grips the second grip when rotating the rotation unit relative to the non-rotation unit.

According to such an aspect, when mounting the second assembly on the first assembly that is fixed to the main body, the operator enables rotating the rotation unit while gripping the second grip of the non-rotation unit.

Therefore, the operator enables to further smoothly mount the second assembly relative to the first assembly.

(4) In addition, the non-rotation unit comprises optionally a piping mounting unit and an insertion hole. The tip of the piping is mounted on the piping mounting unit. The insertion hole, into which the piping that is mounted on the piping mounting unit is inserted, is installed at a distance from the piping mounting unit.

With respect to the sample vaporization unit, given the piping is bent and the piping is bent at the tip thereof, the piping per se is broken or the piping is off from the mounting unit.

According to the above aspect, even when the piping is bent, the portion between the tip of the piping and the insertion port of the insertion hole is at a straight line.

Therefore, when the piping is bent, the piping per se is protected from damaging and that the piping gets off from the mounting unit.

(5) In addition, the second connection element is held by the rib formed on the non-rotation unit. The insertion hole may be installed at the rib.

According to such an aspect, the piping and the second connection element can be placed in the limited space and as a result, the space saving is brought into reality.

Effects of the Present Invention

According to the aspect of the present invention, when mounting the second assembly on the first assembly fixed to the main body, the operator enables positioning the second assembly only by connecting the second connection element of the second assembly with the first connection element of the first assembly. Therefore, the second assembly can be smoothly mounted on the first assembly that is fixed to the main body. Further, when rotating the rotation unit, the second connection element of the non-rotation unit connects with the first connection element of the first assembly. Therefore, it is prevented that the non-rotation unit rotates together with the rotation unit. As a result, the assemblies that contact to the non-rotation unit can be protected from damaging.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

1. An Entire Structure of a Gas Chromatograph

Figure 1:
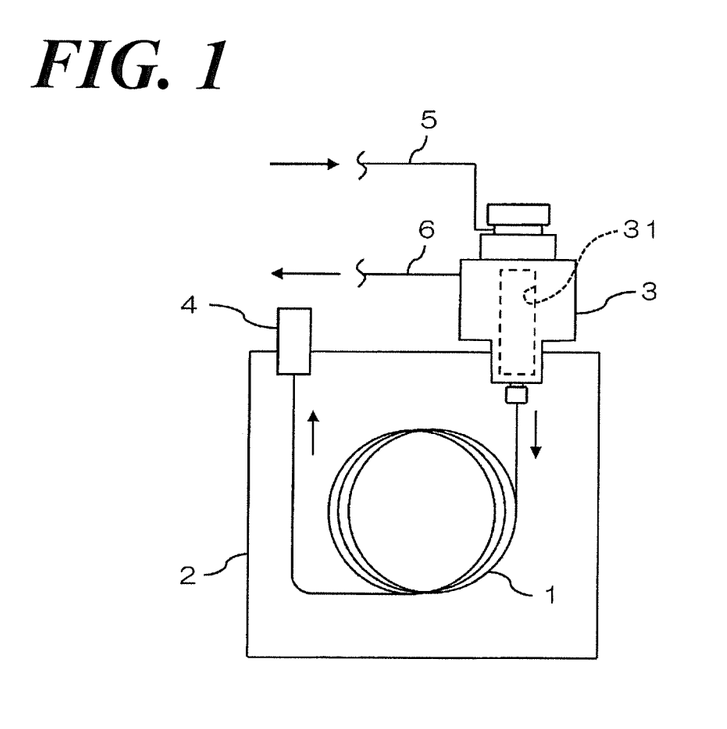
FIG. 1 is a schematic view illustrating an example of the structure of the gas chromatograph having the sample vaporization unit 3 according to the aspect of the Embodiment 1 of the present invention.

FIG. 1 is a schematic view illustrating the example structure of a gas chromatograph comprising the sample vaporization unit 3 according to the aspect of the Embodiment of the present invention. The gas chromatograph performs an analysis by supplying the sample gas into a column 1 with carrier gas and comprises a column oven 2, a sample vaporization unit 3 and a detector 4 in addition to the column 1.

The column 1 comprises e.g., a capillary column. The column oven 2 houses a heater and a fun (not shown in FIG.) together with the column 1.

The column oven 2 heats the column 1 and drives arbitrarily the heater and the fun (not shown in FIG.) upon analysis.

The sample vaporization unit 3 functions to introduce the carrier gas and the sample gas into the column 1 and comprises the sample vaporization chamber 31 there inside. A liquid sample is injected into the sample vaporization chamber 31 and the sample vaporized in the sample vaporization chamber 31 is introduced into the column 1 together with the carrier gas. In addition, the gas supply pathway 5 and the split pathway 6 are continuously connected to the sample vaporization chamber 31.

The gas supply pathway 5 is the pathway through which the carrier gas is supplied to the sample vaporization chamber 31 of the sample vaporization unit 3.

The split pathway 6 is the pathway through which a part of the gas inside the sample vaporization chamber 31 (the mix gas of the carrier gas and the sample gas) is exhausted to outside thereof with a predetermined split ratio when the carrier gas and the sample gas is introduced into the column 1 using the split introduction method.

The detector 4 comprises e.g., the hydrogen flame ionization detector (FID). The detector 4 detects each sample component included in the carrier gas introduced from the column 1, in order.

When the gas chromatograph measures the sample, the target analysis sample is injected into the sample vaporization unit 3. The sample is vaporized in the sample vaporization chamber 31. In addition, the carrier gas is supplied to the sample vaporization chamber 31 of the sample vaporization unit 3 through the gas supply pathway 5.

The sample vaporized in the sample vaporization chamber 31 is introduced into the column 1 together with the carrier gas. Each sample component of the sample is separated while passing through the column 1 and introduced into the detector 4.

And each sample component included in the carrier gas introduced from the column 1 is detected in order at the detector 4. In addition, a chromatogram is generated based on the detection results at the detector 4.

2. Structure of the Sample Vaporization Unit

Figure 2A:
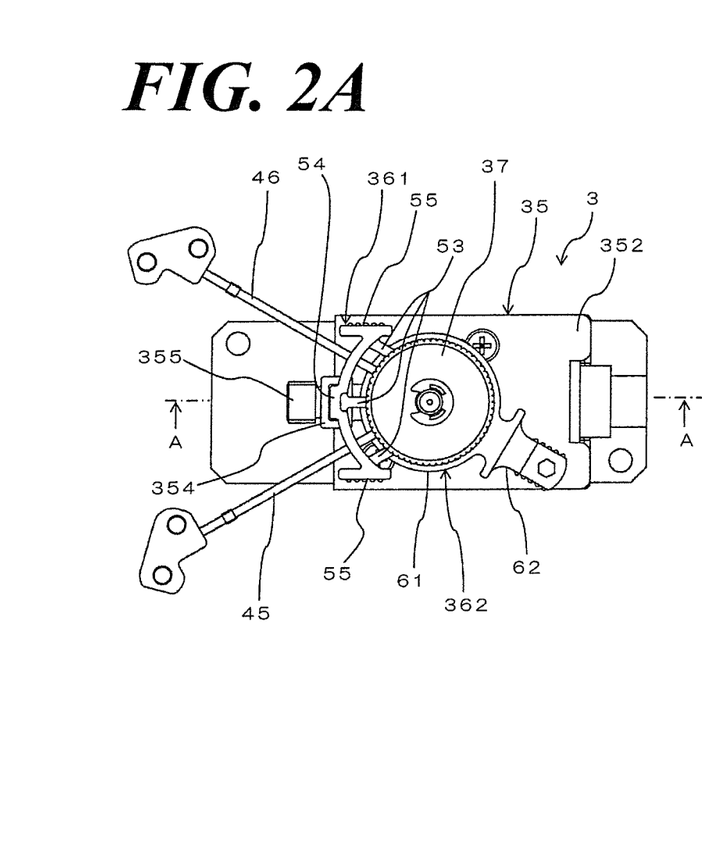
FIG. 2A is a plane view illustrating the sample vaporization unit 3 referring to FIG. 1.
Figure 2B:
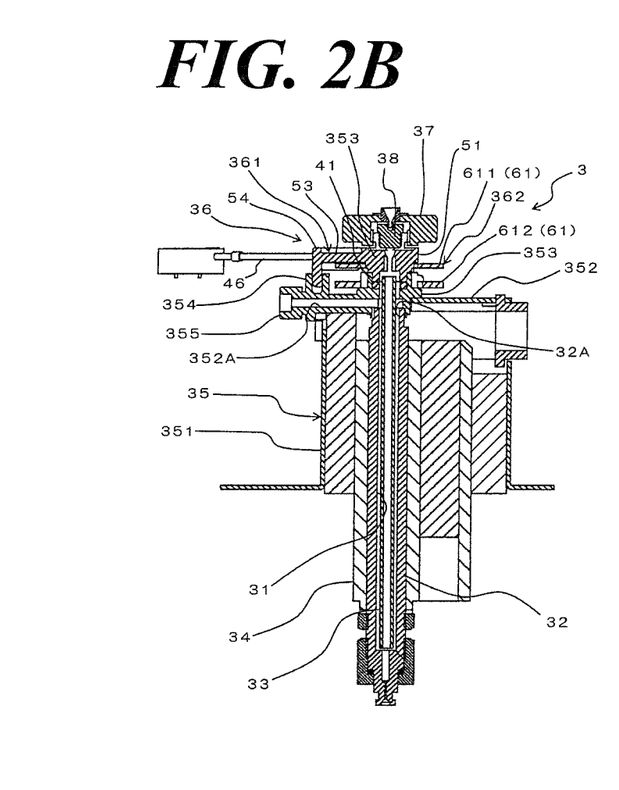
FIG. 2B is a cross section side view along the line A-A in FIG. 2A.
Figure 3:
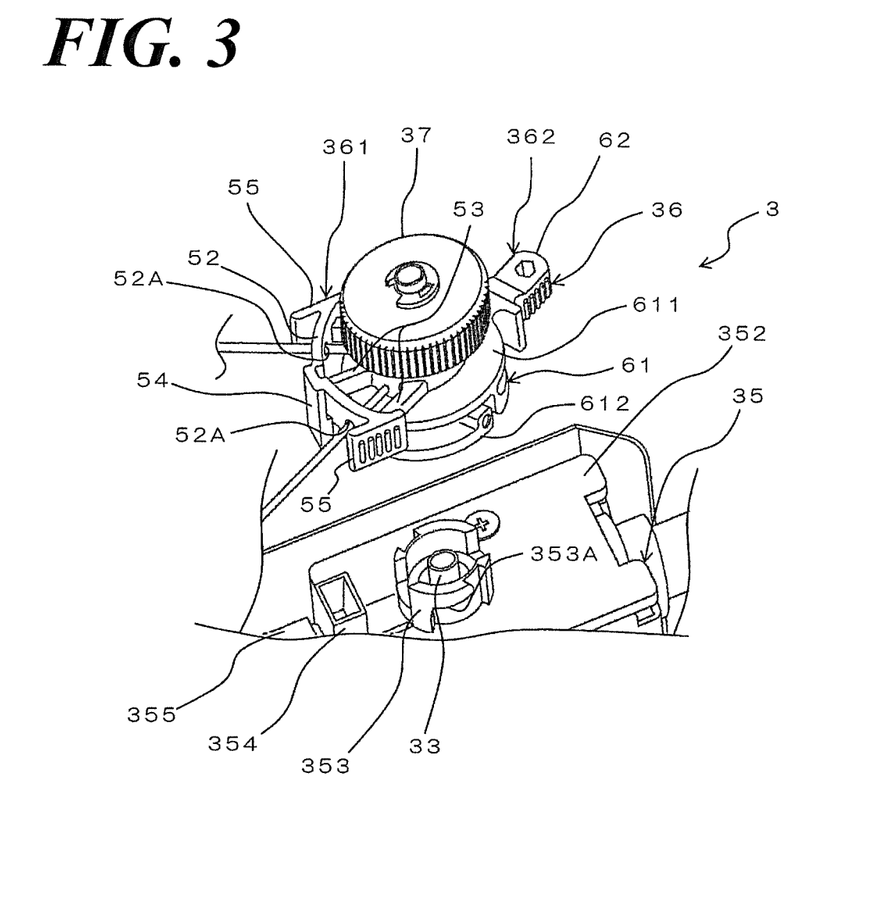
FIG. 3 is a perspective view illustrating the sample vaporization unit of which the second assembly is removed from the first assembly.

FIG. 2A is a plane view illustrating sample vaporization unit 3. FIG. 2B is a cross section side view along the line A-A in FIG. 2A. FIG. 3 is a perspective view illustrating the sample vaporization unit 3 of which the second assembly 36 is removed from the first assembly 35.

The sample vaporization unit 3 set forth above comprises a main body 32, an insert 33, a heating block 34, a first assembly 35 and a second assembly 36 and a septum cap 37 and a septum 38.

Referring to FIG. 2B, the main body 32 is a long hollow cylinder. The inside space of the main body 32 is formed as the sample vaporization chamber 31 set forth above. The inside space of the top-end of the main body 32 is the opening 32A.

The insert 33 is in-place (inserted) in the sample vaporization chamber 31 of the main body 32 The insert 33 is a cylinder shape and made of e.g., a glass material.

The heating block 34 is in-palace outside the main body 32 and covers the main body 32. The heating block 34 is fixed to the main body 32.

The first assembly 35 is in-place outside main body 32. The first assembly 35 is like a box having an opening at the bottom end (hollow). The first assembly 35 comprises the side wall element 351, the top board 352, the mounting unit 353, the first assembly 354 and the split vent 355.

The side wall element 351 is like a rectangular column extending upward and downward.

The top board 352 is installed to the top end of the side wall element 351. Referring to FIG. 2A, the top board 352 is visually a rectangular plane board. Referring to FIG. 2B, the top board 352 comprises the pathway 352A.

In addition, referring to FIG. 2B, FIG. 3, the mounting unit 353 is installed to the central part of the top board 352. The mounting unit 353 is annularly formed. The inside space of the mounting unit 353 is continuously connected with the inside space of the side wall element 351 and the pathway 352A. Referring to FIG. 3, the outer surface of the mounting unit 353 comprises a groove 353A extending in the crossing direction to the axis-line direction of the mounting unit 353. Referring to FIG. 2B, an O-ring 41 is installed at the top end of the mounting unit 353.

Referring to FIG. 2B and FIG. 3, the first assembly 354 is installed on the top-surface of the one end of the top board 352. The first assembly 354 is like a rectangular column and extending upward from the top board 352. The first assembly 354 is in-place over the pathway 352A.

Referring to FIG. 2A and FIG. 2B, the split vent 355 is installed to the side surface of the one end of the top board 352. The split vent 355 is like a cylinder and extending in the horizontal direction from the top board 352. The inside space of the split vent 355 is continuously connected with pathway 352A of the top board 352. The inside space of the split vent 355 and the pathway 352A of the top board 352 are the part of the split pathway 6 (referring to FIG. 1).

Referring to FIG. 2B, the first assembly 35 is fixed to the main body 32. Specifically, the top end of the main body 32 and the mounting unit 353 of the first assembly 35 are fixed while the main body 32 (the main body 32, the insert 33 and the heating block 34) are in-place in the space inside the side wall element 351 of the first assembly 35.

The second assembly 36 is in-place over the first assembly. The second assembly 36 comprises the non-rotation element 361 and the rotation element 362.

Figure 4:
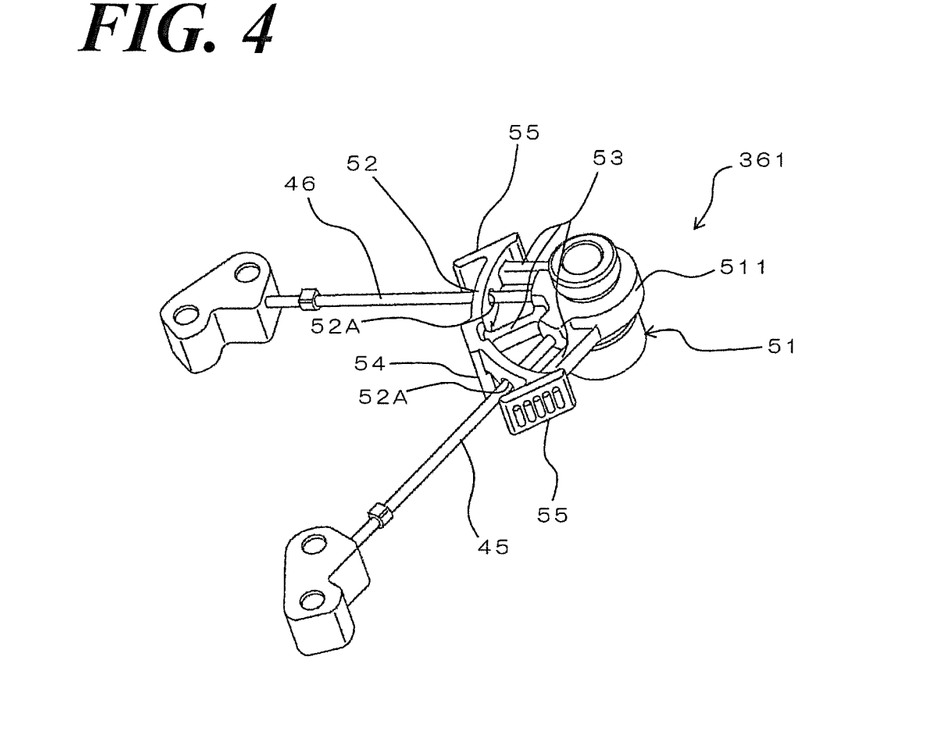
FIG. 4 is a perspective view illustrating the non-rotation unit of the sample vaporization unit.

FIG. 4 is a perspective view illustrating the non-rotation unit 361 of the sample vaporization unit 3 (the second assembly 36).

The non-rotation element 361 comprises the cylinder 51, the rib 52, the connector 53, the second assembly 54 and the first grip 55.

The cylinder 51 is formed like a cylinder. The outer surface of the top end of the cylinder 51 comprises a thread (screw thread), not shown in FIG. The central portion in the axis direction of the cylinder element 51 comprises a piping mounting element 511.

The mounting unit 511 protrudes radially and outward from the outer surface of the cylinder 51 and is annularly formed. The piping mounting unit 511 comprises a plurality (two) of the mounting holes (not shown in FIG.) is radially extending. Such a mounting hole is a continuous hole in the space inside the cylinder 51.

The rib 52 is in-place to be away from the piping mounting unit 511 with some distance. The rib 52 is like an arch extending circumference direction of which center is the axis-line of the cylinder 51. The rib 52 comprises a plurality (two) of the insertion holes 52A. Each insertion hole 52A penetrates radially the rib 52. Each insertion hole 52A is facing the mounting hole of the piping mounting unit 511.

The connection element 53 is in-place between the rib 52 and the piping mounting unit 511. The connection element 53 comprises a plurality (three) of rods. The connection element 53 connects the rib 52 and the piping mounting unit 511.

The second connection element 54 is installed at the center portion of the rib 52. The second connection element 54 is like a rectangular column. The second connection element 54 is extending in the axis direction (downward) from the rib 52 and held by the rib 52. The positional relationship between the second connection element 54 of the non-rotation unit 361 (second assembly 36) and the cylinder element 51 corresponds to the positional relationship between the first connection element 354 of the first assembly 35 and the mounting unit 353.

The first grip 55 is installed on both ends of the rib 52. The first grip 55 is in a form of a plate. The first grip 55 is in-place along the direction crossover the extending direction of the rib 52.

The gas supply piping 45 of which inside space is formed as a part of the gas supply pathway 5 (referring to FIG. 1) and the purge piping 46 of which inside space is formed as a part of the purge pathway are mounted on the piping mounting unit 511 (mounting hole of the piping mounting unit 511) of the non-rotation unit 361. Specifically, each top end of the gas supply piping 45 and the purge piping 46 is mounted on the piping mounting unit 511 (the mounting hole of the piping mounting unit 511). Further specifically, the approximately 4 mm length portion from each top end of the gas supply piping 45 and the purge piping 46 is inserted into the piping mounting unit 511. Each mid-portion of the gas supply piping 45 and the purge piping 46 is inserted into each insertion hole 52A of the piping mounting unit 511.

Figure 5:
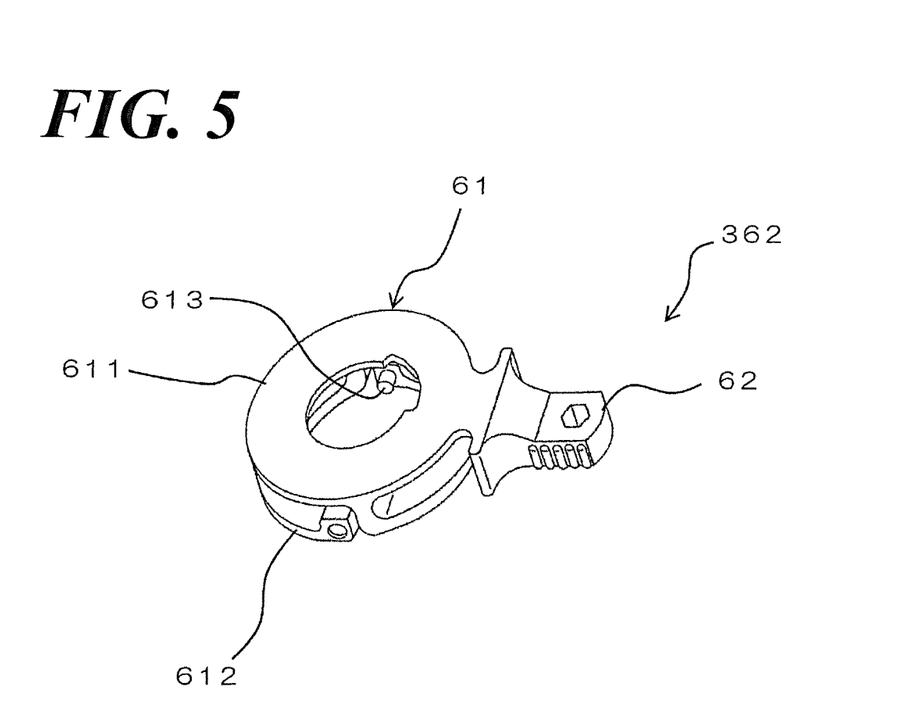
FIG. 5 is a perspective view illustrating the rotation unit of the sample vaporization unit referring to FIG. 1.

FIG. 5 is a perspective view illustrating the rotation unit 362 of the sample vaporization unit 3 (second assembly 36).

The rotation element 362 comprises the blade spring member 61 and the second grip 62.

The blade spring member 61 is the member forming the blade spring and comprises the fixing element 611 and the connection element 612.

The electric fixing element 611 is formed as an annular shape and has a constant thickness.

The connection element 612 is installed at one side (lower side) in the axis direction of the fixing element 611. The connection element 612 is formed as an annular shape and has a constant thickness. A part of the connection element 612 is a continued portion of the fixing element 611. The connection element 612 comprises a connection protrusion 613 protruding inward in the radial direction from the inner circumference surface.

The second grip 62 is installed on the outer circumference surface of the fixing element 611. The second grip 62 is formed as a rectangular column and protruding outward in the radial direction from the fixing element 611 (blade spring member 61).

Figure 6:
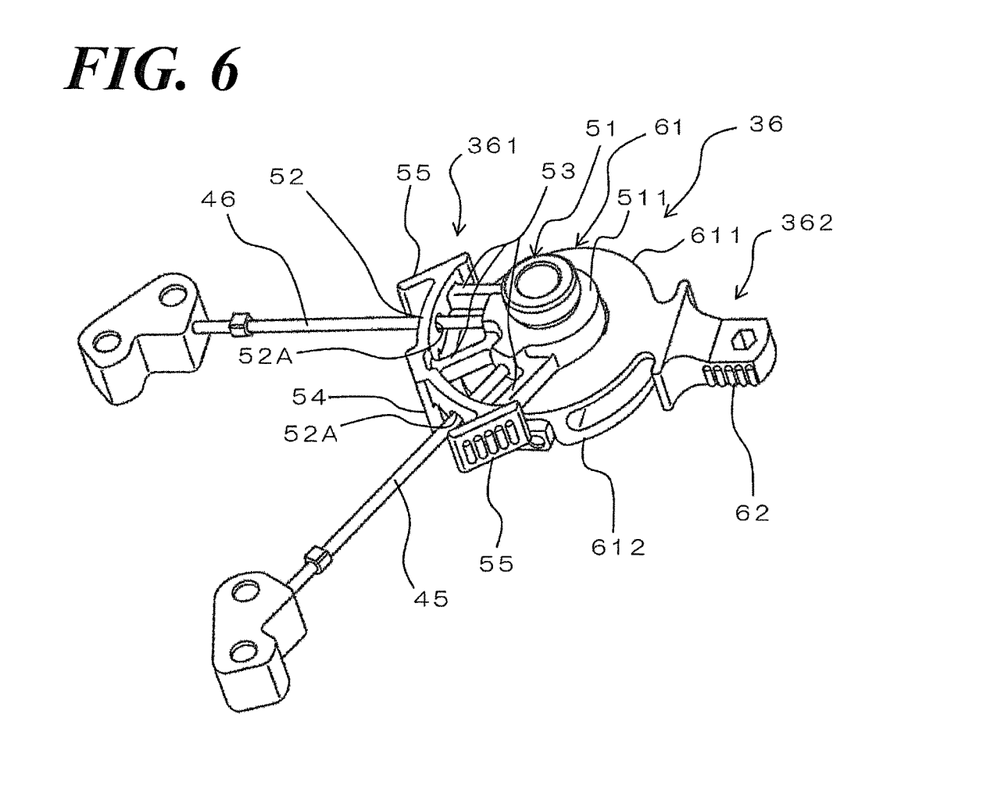
FIG. 6 is a perspective view illustrating the state in which the rotation unit of the sample vaporization unit is mounted on the non-rotation unit 361 of the sample vaporization unit.

FIG. 6 is a perspective view illustrating the state in which the rotation unit 362 is mounted on the non-rotation unit 361.

The rotation unit 362 is mounted on the non-rotation unit 361 so as to be relatively rotatable in the state in which the cylinder element 51 (referring to FIG. 4) of the non-rotation unit 361 is being inserted into the inside space of the fixing element 611 and the inside space (referring to FIG. 5) of the connection element 612. Specifically, the center portion of the cylinder element 51 (i.e., the part lower than the cylinder mounting unit 511 of the cylinder 51) of the non-rotation unit 361 is inserted into the inside space of the fixing element 611 and the inside space of the connection element 612. And in such a state, C-ring (not shown in FIG.) is mounted on the cylinder 51 at the lower part of the fixing element 611. Accordingly, the fixing element 611 of the rotation unit 362 is held by the C-ring mounted on the cylinder 51, so that the non-rotation unit 361 and the rotation unit 362 become relatively rotatable. In such a way, the second assembly 36 is assembled.

Referring to FIG. 2B, FIG. 3, the septum cap 37 comprises a cylinder nut having the thread on the inner surface thereof. The septum cap 37 is mounted on the top end of the cylinder 51 of the second assembly 36 (non-rotation unit 361). The septum 38 is in-place between the septum cap 37 and the cylinder 51. The septum 38 is being held by the septum cap 37 and the cylinder 51 by fastening the septum cap 37.

3. Mounting the Second Assembly on the First Assembly

Referring to FIG. 3, when the second assembly 36 is mounted on the first assembly 35, the operator first places the second assembly 36 above the first assembly 35. And the operator moves the second assembly 36 to the first assembly 35 (downward) so as to insert the second connection element 54 of the non-rotation unit 361 of the second assembly 36 into the inside space of the first connection element 354 of the first assembly 35 while holding the first grip 55 of the non-rotation unit 361 of the second assembly 36.

Accordingly, referring to FIG. 2B, the cylinder 51 of the non-rotation unit 361 is inserted into the inside space of the mounting unit 353. In addition, the connection protrusion 613 of the rotation unit 362 (referring to FIG. 5) sets in the thread 353A (referring to FIG. 3) of the mounting unit 353.

Once the operator further moves downward the second assembly 36, the second connection element 54 of the non-rotation unit 361 connects with the inner circumference surface of the first connection element 354 and the cylinder 51 of the non-rotation unit 361 connects with the O-ring 41 installed on the mounting unit 353. In such a way, the second assembly 36 is positioned relative to the first assembly 35.

And the operator rotates the rotation unit 362 relative to the non-rotation unit 361 by gripping the second grip 62 of the rotation unit 362 while gripping the first grip 55 of the non-rotation unit 361 as fixing (i.e., rotates the rotation unit 362 clockwise in planar view).

Then the connection protrusion 613 of the blade spring member 61 of the rotation unit 362 connects with the edge of the thread 353A of the mounting unit 353 of the second assembly 36 (referring to FIG. 3). Accordingly, a force is added to the connection protrusion 613 so as to disengage from the fixing element 611, the distance between the fixing element 611 and the connection element 612 is longer and as a result, the downward force is added to the fixing element 611. And the downward force is added to the cylinder 51 of the non-rotation unit 361 by the fixing element 611 and as a result, the cylinder 51 presses the O-ring 41 installed on the mounting unit 353.

At this time, the second connection element 54 of the non-rotation unit 361 of the second assembly 36 connects with the inner surface of the first connection element 354 of the first assembly 35, so that the second assembly 36 will not rotate together with the rotation unit 362 (non-corotation), so that the positioning state is maintained.

In such a way, the second assembly 36 is mounted relative to the first assembly 35.

In addition, when changing the insert 33, the operator carries out the reverse operation against the operation set forth above. Specifically, the operator rotates the rotation unit 362 relative to the non-rotation unit 361 by gripping the second grip 62 of the rotation unit 362 in the reverse direction against the direction set forth above while gripping the first grip 55 (referring to FIG. 6) of the non-rotation unit 361 as fixing (i.e., rotates the rotation unit 362 counterclockwise in planar view). And the operator moves upward the second assembly 36 while gripping the first grip 55 of the non-rotation unit 361. In such a way, the second assembly 36 is dismounted (removed) from the first assembly 35.

In such a state, the operator moves upward the insert 33 to pull off from the main body 32. And the operator inserts the new insert 33 into the sample vaporization chamber 31 through the opening 32A of the main body 32.

Followingly, the operator mounts the second assembly 36 on the first assembly 35 as set forth above. Therefore, the second assembly 36 (the second assembly 36 and the first assembly 35) closes the opening 32A of the main body 32.

In addition, the gas supply piping 45 and the purge piping 46, which are mounted on the non-rotation unit 361, are arbitrarily subjected to bending depending on the arrangement of the parts in the gas chromatograph. As set forth above, each of the tip of the gas supply piping 45 and the tip of the purge piping 46 is mounted on the piping mounting unit 511 (i.e., the mounting hole of the piping mounting unit 511). Each mid-portion of the gas piping 45 and the purge piping 46 is inserted into each insertion hole 52A of the piping mounting unit 511. Accordingly, even when the gas supply piping 45 and the purge piping 46 are respectively bent, the portion between the mid-portion of the gas supply piping 45 and the tip thereof and the portion between the mid-portion of the purge piping 46 and the tip thereof are kept as a straight line, so that the burden on the mounting unit of each piping can be avoided.

In addition, the second assembly 36 has the above structure and the surface area thereof is larger. Therefore, the second assembly 36 is effectively cooled down by outside air. As a result, the septum 38 is effectively cooled down placed between the second assembly 36 (cylinder 51) and the septum cap 37, so that the contamination of the component of the septum 38 with the sample gas can be prevented.

4. Action and Effect (1) Referring to FIG. 3, according to the aspect of the present Embodiment, when mounting the second assembly 36 on the first assembly 35 that is fixed to the main body 32, the non-rotation unit 361 of the second assembly 36 connects (is inserted into) with the first connection element 354 of the first assembly 35, so that the positioning of the second assembly 36 (non-rotation unit 361) is carried out. And the rotation unit 362 rotates from the state in which the non-rotation unit 361 is being positioned, so that the rotation unit 362 is mounted on the first assembly 35.

Accordingly, when mounting the second assembly 36 relative to the first assembly 35 fixed to the main body 32, the positioning of the second assembly 36 can be carried out just only by connecting the second connection element 54 of the second assembly 36 (non-rotation unit 361) with the first connection element 354 of the first assembly 35.

As a result, the second assembly 36 can be smoothly mounted on the first assembly 35 that is fixed to the main body 32.

Further, when rotating the rotation unit 362, the second connection element 54 of the non-rotation unit 361 connects with the first connection element 354 of the first assembly 35.

Therefore, it is prevented that the non-rotation unit 361 rotates together with the rotation unit 362.

As a result, the assembly (O-ring 41) that contacts to the non-rotation unit 361 can be protected from damaging.

(2) In addition, referring to FIG. 3 according to the aspect of the present Embodiment, the non-rotation unit 361 of the second assembly 36 further comprises the first grip 55.

Accordingly, when mounting the second assembly 36 on the first assembly 35 fixed to the main body 32, the operator can rotate the rotation unit 362 while gripping the first grip 55 of the non-rotation unit 361.

As a result, the second assembly 36 can be smoothly mounted on the first assembly 35 that is fixed to the main body 32.

(3) In addition, referring to FIG. 3, the rotation unit 362 of the second assembly 36 further comprises the second grip 62.

Therefore, when mounting the second assembly 36 on the first assembly 35 fixed to the main body 32, the operator can rotate the rotation unit 362 while gripping the second grip 62.

As a result, the second assembly 36 can be smoothly mounted on the first assembly 35 that is fixed to the main body 32.

(4) In addition, according to the aspect of the present Embodiment, referring to FIG. 6, the non-rotation unit 361 comprises the piping mounting unit 511 and an insertion hole 52A. The tip of the gas supply piping 45 and the tip of the purge piping 46 are respectively mounted on the piping mounting unit 511. Each mid-portion of the gas supply piping 45 and the purge piping 46 is inserted into the insertion hole 52A.

When each tip of the gas supply piping 45 and the purge piping 46 is bent from the tip when bending the gas supply piping 45 and the purge piping 46, the gas supply piping 45 and the purge piping 46 may break down or may come off from the mounting unit.

According to the aspect of the present Embodiment, even when the gas supply piping 45 and the purge piping 46 are bent, the portion between the tip of the gas supply piping 45 and the insertion port to the insertion hole 52A and the portion between the tip of the purge piping 46 and the insertion port to the insertion hole 52A can be maintained as a straight line.

Therefore, when the gas supply piping 45 and the purge piping 46 are bent, the gas supply piping 45 and the purge piping 46 can be protected from damaging and coming off from the mounting unit.

(5) In addition, the second connection element 54 relative to the non-rotation unit 361 is held by the rib 52, and the rib 52 comprises the insertion hole 52A.

Therefore, the second connection element 54, the gas supply piping 45 and the purge piping 46 can be placed in the limited space and as a result, the space saving is brought into reality.

5. Alternative Embodiment

According to the aspect of the Embodiment set forth above, the inventor sets forth that the first connection element 354 formed relative to the first assembly 35 and the second connection element 54 formed relative to the second assembly 36 (non-rotation unit 361) are respectively just one. However, the first connection element 354 and the second connection element 54 can be plural as long as both are making a pair.

In addition, according to the aspect of the Embodiment set forth above, the inventor sets forth that the first connection element 354 formed relative to the first assembly 35 is concave (cylinder shape) and the second connection element 54 formed relative to the second assembly 36 (non-rotation unit 361) is convex (rod shape). However, the first connection element 354 can be convex and the second connection element 54 can be concave.

In addition, according to the aspect of the Embodiment set forth above, the inventor sets forth that the rotation unit 362 comprises the blade spring member 61 and the second grip 62 and the second grip 62 is gripped and rotates. However, the rotation unit 362 can be a nut of which inner circumference surface has a thread.

REFERENCE OF SIGNS

3 Sample vaporization unit
1 Sample vaporization chamber
32 Main body
32A Opening
33 Insert
35 First assembly
36 Second assembly
45 Gas supply piping
46 Purge piping
52 Rib
52A Insertion hole
54 Second connection element
55 First grip
62 Second grip
354 First connection element
361 Non-rotation unit
362 Rotation unit
511 Piping mounting unit It will be further understood by those of skill in the art that the apparatus and devices and the elements herein, without limitation, and including the sub components such as operational structures, elements of all kinds, and any combinations of these structures etc. as will be understood by those of skill in the art as also being identified as or capable of operating the systems and devices and subcomponents noted herein and structures that accomplish the functions without restrictive language or label requirements since those of skill in the art are well versed in related analysis systems and element without departing from the scope and spirit of the present invention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Also, the inventors intend that only those claims which use the words "means for" are intended to be interpreted under 35 USC 112 only when the word 'means' and 'for' are used together, next to each other in the form of "means for", and not otherwise. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A sample vaporization unit, comprising:
    a main body that further comprises a sample vaporization chamber inside therein;
    an insert that is inserted into said sample vaporization chamber through an opening formed into said main body;
    a first assembly that is fixed to said main body; and
    a second assembly that is mountable on said first assembly and removable therefrom and closes said opening while being mounted on said first assembly;
    wherein said first assembly further comprises a first connection element, said second assembly further comprises a non-rotation unit, having a second connection element of which positioning is carried out by connecting with said first connection element and a rotation unit that is mountable to said first assembly by rotating relative to said non-rotation unit; and
    said non-rotation unit further comprises a piping mounting unit to which a tip of said piping is mounted and an insertion hole, through which said piping mounted on said piping mounting unit is inserted and is formed apart from said piping mounting unit.

2. The sample vaporization unit, according to claim 1, wherein:
    said rotation unit further comprises a first grip that an operator grips during a use.

3. The sample vaporization unit, according to claim 2, wherein:
    said rotation unit further comprises a second grip that the operator additionally grips during said use when said rotation unit rotates relative to said non-rotation unit.

4. The sample vaporization unit, according to claim 1, wherein:
    said second connection element is held by a rib formed to said non-rotation unit, and said insertion hole is formed to said rib.

* * * * *